April 17, 1934.　　　C. C. WHITTAKER　　　1,955,319
RAILWAY CONTROL SYSTEM
Filed May 16, 1931
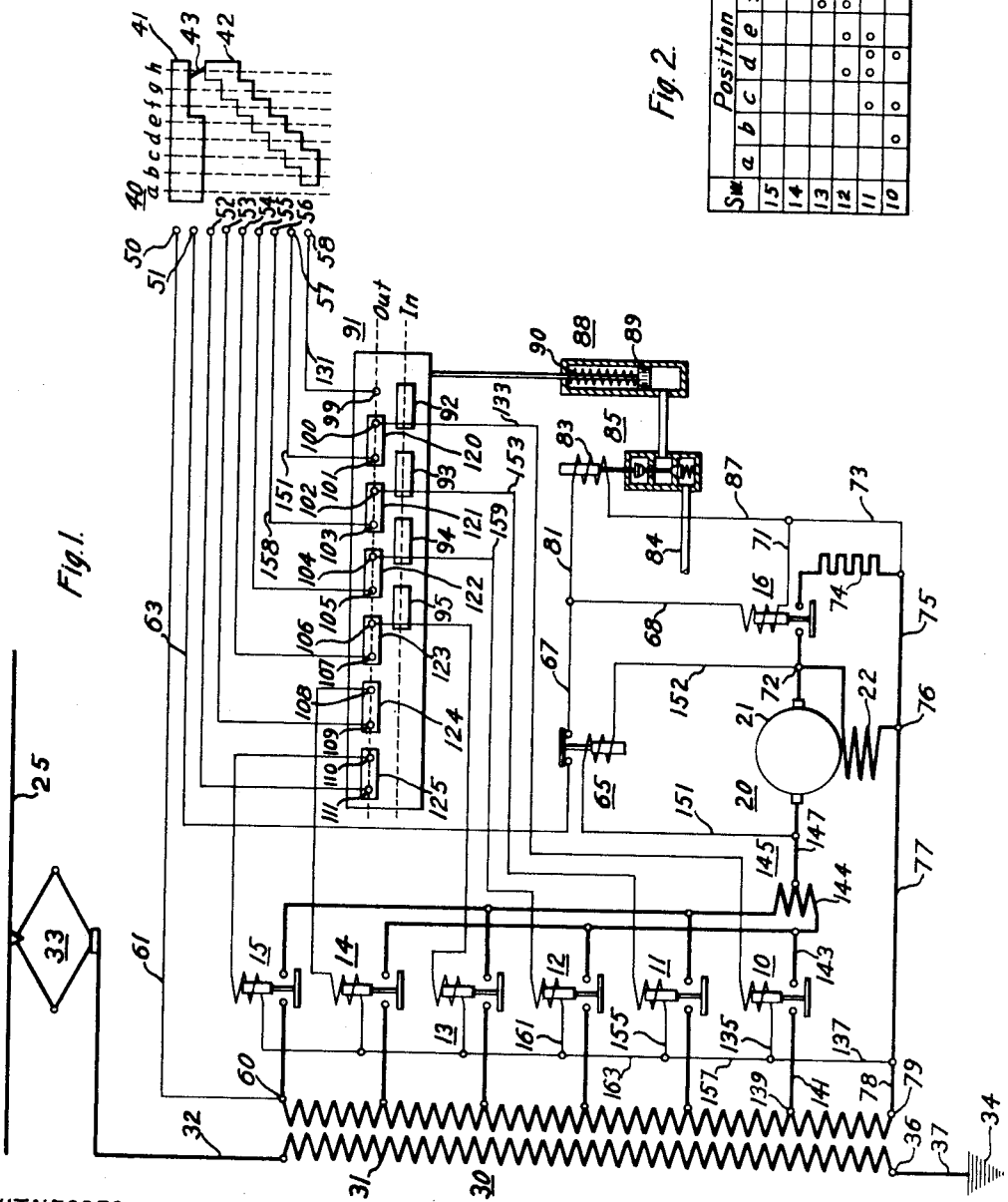
INVENTOR
Charles C. Whittaker Patented Apr. 17, 1934

1,955,319

UNITED STATES PATENT OFFICE 1,955,319

RAILWAY CONTROL SYSTEM

Charles C. Whittaker, Pittsburgh, Pa., assignor to Westinghouse Electric & Manufacturing Company, a corporation of Pennsylvania Application May 16, 1931, Serial No. 537,801

6 Claims. (Cl. 172—179)

My invention relates, generally, to motor-control systems and more particularly to a system for controlling the operation of a railway motor.

The object of my invention, generally stated, is the provision of a control system that shall be simple and efficient in operation and may be readily and economically manufactured and installed.

A more specific object of my invention is to provide for starting a motor with its field flux limited to a low value during the initial stages of the starting period to attain good commutation at high tractive effort and for changing the field flux from a low value to a high value whenever the tractive effort is reduced by a predetermined amount.

It is also an object of my invention to provide for starting a motor with its field flux limited to a low value during the initial stages of the starting period and for reducing the armature flux by a predetermined amount at the instant the field flux is changed from a low value to a high value, whereby the total change of flux in the motor is limited to a small value during this transition.

Other objects of the invention will hereinafter become apparent.

The invention is disclosed in the embodiment thereof shown in the accompanying drawing and comprises the structural features, the combination of elements and the arrangement of parts that will be exemplified in the structure hereinafter set forth, and the scope of the application of which will be indicated in the claims.

For a fuller understanding of the nature and the objects of my invention, reference should be had to the following detailed description, taken in connection with the accompanying drawing, in which:

Figure 1 is a diagrammatic view of a control system constructed in accordance with my invention, and Fig. 2 is a chart illustrating the sequence of operation of the accelerating switches.

In order to accomplish, broadly, the objects of my invention, I provide for shunting the field winding of a motor during the initial stages of the starting period and for removing the shunt whenever the tractive effort is decreased by a predetermined amount. The shunting of the field winding limits the field flux to a comparatively low value, and, as a result, so proportions the total flux of the motor, between the armature winding and the field winding, as to attain good commutation when the motor is developing a high tractive effort during the initial stages of the starting or acceleration period.

The shunting circuit for the field winding is established by utilizing a shunting switch, which is controlled by a voltage relay that is responsive to the voltage across the armature of the motor. Whenever the voltage across the armature reaches a predetermined value, the voltage relay operates to deenergize the shunting relay, thereby interrupting the shunting circuit which was previously established across the field winding of the motor. As will be readily understood, the voltage relay may be set or adjusted in such manner that its operation will occur at some time during the first few starting positions of the master controller, or, in other words, during the initial stages of the starting period.

It will be apparent, however, that when the field shunt is removed, the tractive effort developed by the motor will suddenly rise to a high value, because of the increase of the field flux. In order to alleviate this sudden change in tractive effort, I provide for reducing the power input or the voltage supplied to the motor by a predetermined amount at the instant the field shunt is removed. In this manner, the change which occurs in the total flux in the motor is limited to a small value, thereby effecting a smooth and continuous increase in tractive effort whenever the field shunt is removed.

In order to effect a reduction in the power input to the motor, without actuating the master controller in the reverse direction to a preceding position, I provide for utilizing an interlock switch which is actuated by a pneumatic device suitably controlled by an electro-pneumatic valve. Operation of the interlock switch establishes circuits whereby the power input to the motor is reduced to a value equal to that effected by the circuits of the preceding controller position.

In order to provide for actuating the interlock switch simultaneously with the removing of the field shunt, the electro-pneumatic valve is connected in circuit with the same voltage relay that is utilized for controlling the shunting switch.

Referring now to the drawing, a motor 20 of any suitable type may be employed for propelling the vehicle. In this particular embodiment of the invention, a series motor having an armature winding 21 and a series field winding 22, is illustrated. As shown, the motor is disposed for energization from a trolley conductor 25.

As is the usual practice in alternating-current railway control systems, a transformer, designated generally by the reference character 30, is used to step the voltage down to a value suitable for utilization. The transformer is connected between the trolley conductor 25 and a ground designated, generally, by the reference character 34. As shown, one terminal of the primary winding 31 is connected to the trolley conductor 25 by means of a conductor 32 and a pantograph 33, the opposite terminal of the primary winding 31 being connected to ground by the conductor 37.

In order to control the starting and acceleration of the motor 20, a master controller 40, which is provided with movable contact segments 41 and 42, is utilized. The master controller is disposed to be set in any one of a plurality of positions "a" to "h", inclusive. As shown, the movable contact segments of the master controller are disposed to engage contact fingers 50 to 58, inclusive, as it is moved to its different operating positions.

It may be assumed now that the master controller 40 is actuated to set the contact segment 41 in position "a", where it engages contact fingers 50 and 51. In this position, current flows from a terminal 60 of the secondary winding of the transformer 30 through a conductor 61, contact finger 50, contact segment 41, contact finger 51, conductor 63, contact members of the voltage relay 65, conductors 67 and 68, the magnetizing coil of the shunting switch 16 and conductors 71, 73, 75, 77 and 78, to the terminal 79 of the secondary winding. Another circuit is also established which extends from the conductor 67, through conductor 81, magnetizing coil 83 of an electro-pneumatic valve 85, and conductors 87, 73, 75, 77 and 78, to the terminal 79.

Therefore, the magnetizing coils of the shunting switch 16 and the electro-pneumatic valve 85 are energized. Operation of the switch 16 establishes a shunting circuit which extends from a terminal 72 of the series field winding 22, through the contact members of the switch 16, a resistor 74 and conductor 75, to the opposite terminal 76 of the field winding.

Operation of the electro-pneumatic valve permits air, under pressure, to flow through it from a pipe 84, which may be connected to a suitable source of air supply (not shown) and hence into the cylinder of a pneumatic actuating device 88 having a piston 89, which is mechanically connected to an interlock switch designated, generally, by the reference character 91. The upward movement of the piston 89 so actuates the interlock switch that the lower row of contact segments 92 to 95, inclusive, are brought into engagement with a plurality of contact fingers 99 to 106, inclusive. The piston 89 is provided with a suitable biasing spring 90 which biases the piston to its lower position, as shown, when the air is permitted to escape from the cylinder of the pneumatic actuating device.

For the purpose of explanation, the position to which the interlock switch 91 is now actuated will be designated as the "in" position, and the opposite position, as shown, as the "out" position. In the latter position, a plurality of contact segments 120 to 125, inclusive, are disposed to engage the contact fingers 100 to 111, inclusive.

It may now be assumed that the master controller 40 is actuated to set the contact segments 41 and 42 in the position "b", whereby the segment 41 continues to engage the contact fingers 50 and 51, and the contact segment 42 engages the contact finger 58. In this position, in addition to the circuits which were formerly established to energize the shunting switch and the electro-pneumatic valve 85, another circuit is established to operate the first accelerating switch 10.

The circuit thus established extends from contact segment 42, which is energized from the contact segment 41 by a connecting bar 43, through contact finger 58, conductor 131, contact finger 99, contact segment 92, contact finger 100, conductor 133, magnetizing coil of the switch 10 and conductors 135, 137 and 78, to the secondary winding terminal 79.

Operation of the switch 10 establishes a motor circuit whereby current flows from voltage tap 139, through conductor 141, contact members of the switch 10, conductor 143, a portion 144 of a compensating coil 145, conductor 147, armature 21, and hence to the terminal 72 of the field winding, where the current divides, part flowing through the field winding 22 and the other part flowing through contact members of the switch 16, resistor 74, conductor 75 and thence to the terminal 76 where the current unites and flows, through conductors 77 and 78, to the terminal 79.

The speed of the motor may be further increased by successively actuating the master controller to its remaining positions, "c" to "h", inclusive, thereby operating the remaining accelerating switches 11, 12, 13, 14 and 15 in proper sequence to give smooth acceleration.

However, as the motor accelerates, it generates a voltage which may be utilized to operate the voltage relay 65 that is connected across the terminals thereof by conductors 151 and 152. Operation of the voltage relay 65 is effected when the voltage developed by the motor armature reaches a predetermined value which usually occurs during the initial stages of the starting period, such, for example, as when the master controller is set on position "c", "d" or "e". In other words, the operation of the voltage relay 65 is effected only after the tractive effort has been reduced by a predetermined amount.

Operation of the voltage relay 65 simultaneously effects the deenergization of the shunting relay 16 and the electro-pneumatic valve 85. In this manner, the switch 16 is caused to function to remove the field shunt at the same time the interlock switch 91 operates to reduce the power input to the motor.

Although the actuation of the voltage relay 65 may occur any time during the initial stages of the starting period, it will be assumed, for the purpose of explanation, that it occurs during the interval when the master controller is in position "d". It will be observed that, in this position and before the occurrence of the transition, the accelerating switches 11 and 12 are energized.

The circuit for energizing switch 11 extends from the contact segment 42, contact finger 57, conductor 151, contact finger 101, the contact segment 93, the contact finger 102, conductor 153, the magnetizing coil of the switch 11 and conductors 155, 157, 137 and 78 to the terminal 79. The circuit for energizing switch 12 extends from the contact segment 42, through the contact finger 56, conductor 158, contact finger 103, contact segment 94, contact finger 104, conductor 159, the energizing coil of the switch 12 and conductors 161, 163, 157, 137 and 78, to the terminal 79.

At this instant, it may be assumed that the voltage-relay 65 operates to simultaneously deenergize the shunting switch 16 and the electro-pneumatic valve 85, thereby causing the interlock switch 91 to be actuated to its "out" position. As will be readily understood, this operation of the interlock switch changes the connections between the master switch and the accelerating switches in exactly the same manner as if the master controller had been actuated in the reverse direction to the preceding position. As will be readily understood, the effect of this change in position of the interlock switch is to interrupt the energizing circuit for switch 12 and reestablish the energizing circuit for switch 10, thereby leaving switches 10 and 11 energized instead of switches 11 and 12.

The energizing circuit for the switch 10 now extends from the contact segment 42, through contact finger 57, the conductor 151, contact finger 101, contact segment 120, contact finger 100, conductor 133, the magnetizing coil of the switch 10 and conductors 135, 137 and 78, to the terminal 79. The energizing circuit for the switch 11 extends from the contact segment 42, through the contact finger 56, conductor 158, contact finger 103, contact segment 121, contact finger 102, conductor 153, magnetizing coil of the switch 11 and conductors 155, 157, 137 and 78, to the terminal 79.

In view of the foregoing, it is apparent that the voltage relay 65 may be caused to function when the tractive effort of the motor has been reduced to a predetermined value, or, in other words, when the voltage developed by the motor exceeds a predetermined value, to render the field winding of the motor fully effective and, at the same time, effect a reduction of the voltage applied to the motor which limits the change of the total flux to a small value.

As will be readily understood, if the voltage applied to the motor were not reduced at the same time the field winding is rendered fully effective, the change or increase of the total flux produced by both the field and armature windings would be great, which would cause the tractive effort of the motor to be suddenly increased to a comparatively high and undesirable value.

As the master controller is successively actuated to the remaining positions, the following sequence of switching operation will be effected. In position "e", switches 11 and 12 are closed; in position "f", switches 12 and 13 are closed; in position "g", switches 13 and 14 are closed; and in position "h", the switches 14 and 15 are closed; whereby the maximum voltage is applied to the motor for full running position.

The sequential operation of the switches just previously described is shown in the chart of Fig. 2. As pointed out in the description, it will also be observed in the chart that, prior to the transition, or while the interlock switch 91 is in the "in" position, switches 11 and 12 are energized and closed, whereas, after the transition is effected, switches 10 and 11 are energized and closed.

Therefore, I have disclosed a control system for starting a motor with its field flux limited to a low value during the initial stages of the starting period so as to obtain good commutation at high tractive effort and for changing the field flux from a low value to a high value whenever the tractive effort is reduced a predetermined amount.

Since certain changes may be made in the above-described construction, and different embodiments of the invention may be made without departing from the scope thereof, it is intended that all matter contained in the above description, or shown in the accompanying drawing, shall be interpreted as illustrative and not in a limiting sense.

I claim as my invention:

1. In a control system, in combination, an electric motor, a transformer for energizing the motor, a plurality of switches for connecting the motor to successive taps on the transformer winding, a controller for normally controlling the operation of said switches to increase the voltage impressed on the motor step-by-step, means operated independently of the controller for causing the switches corresponding to the preceding step of the controller to be actuated, and means responsive to the voltage across the armature of the motor for controlling the operation of the last-named means.

2. In a control system, in combination, an electric motor, a transformer for energizing the motor, a plurality of switches for connecting the motor to successive taps on the transformer winding, a controller for normally controlling the operation of said switches to increase the voltage impressed on the motor step-by-step, interlocking means operated independently of the controller for causing the switches corresponding to the preceding step of the controller to be actuated, and electro-pneumatic means responsive to the voltage across the armature of the motor for controlling the operation of said interlocking means.

3. In a railway control system, in combination, an electric motor of the type having a field winding and an armature winding, a source of energy for the control system, means for shunting the field winding during the initial stages of the starting period to obtain good commutation at high tractive effort, a controller for establishing circuits whereby an increasing voltage is impressed upon the motor as the controller is actuated, notch by notch, towards its "full running" position, and means responsive to the voltage across the armature for rendering the shunting means ineffective and for establishing circuits whereby the voltage impressed upon the motor is reduced to a value substantially equal to that of the preceding controller notch when said voltage-responsive means is actuated.

4. In a railway control system, in combination, an electric motor of the type having a field winding and an armature winding, a source of electrical energy for the control system, a controller for establishing circuits whereby an increasing voltage is impressed upon the motor as the controller is actuated, notch by notch, towards its "full" running position, means for so proportioning the total flux between the armature winding and the field winding during the initial stages of the starting period as to obtain good commutation at high tractive effort, and means for changing this proportion and for establishing circuits whereby the voltage impressed upon the motor is reduced to a value substantially equal to that of the preceding controller notch when the last-mentioned means is operated, said means being responsive to the voltage across the armature winding.

5. In a motor-control system, in combination, a motor provided with armature and series field windings, a source of electrical energy for the motor, means including a master switch for connecting the motor to the said source and for increasing the voltage applied to the armature winding, means responsive to the operating of the master switch to a predetermined position for establishing a shunting circuit for the series field winding, and means responsive to a predetermined increase in the voltage developed by the motor for causing said means for establishing the field shunting circuit to interrupt the circuit and to simultaneously effect a decrease of the voltage applied to the armature.

6. In a motor-control system, in combination, a motor provided with armature and series field windings, a source of electrical energy for the motor, a transformer connected to the said source having its secondary winding provided with a plurality of voltage taps, switches for connecting the motor to the transformer taps, a master switch for controlling said switches, an interlock switch disposed to cooperate with the master switch in controlling the connecting switches, a field-shunting resistor, a shunting switch operable to connect the resistor in shunt relation to the series field winding, means including an electro-pneumatic switch for actuating the interlock switch to predetermined positions, said master switch being disposed to connect the shunting and electro-pneumatic switches in circuit relation with the source of electrical energy, when actuated to a predetermined position, to establish the field shunting circuit and actuate the interlock switch to a predetermined position, whereby the connecting switches may be closed in response to further operation of the master switch, and a relay disposed to respond to a predetermined voltage developed by the motor for simultaneously deenergizing the shunting and electro-pneumatic switches, thereby rendering the series field fully effective and, at the same time, actuating the interlock switch to a different position to so shift the circuit connections between the master switch and the connecting switches as to decrease the voltage applied to the motor without actuating the master switch.

CHARLES C. WHITTAKER.